United States Patent Office 2,754,321
Patented July 10, 1956

2,754,321
PRODUCTION OF PLASTICIZERS

Han Hoog, Amsterdam, and Peter Van't Spijker, The Hague, Netherlands, assignors to Shell Development Company, San Francisco, Calif., a corporation of Delaware No Drawing. Application December 11, 1950,
Serial No. 200,314

Claims priority, application Netherlands
December 23, 1949

2 Claims. (Cl. 260—475)

This invention relates to an improvement in the production of plasticizers and relates more particularly to the preparation from available materials of feed stocks which are suitable for the synthesis of plasticizers.

The function of plasticizers and their use in resins are well known. A great deal of work has been done towards finding more efficient plasticizers. Such work is to be commended even though it tends to distract the attention somewhat from the main problem with which the industry is confronted. This problem is in providing the required amounts of suitable plasticizers at a reasonable cost. When it is considered that the production of the single resin polyvinyl chloride in the United States during the year 1948 was about three hundred million pounds, and that most applications of polyvinyl chloride resin require approximately one pound of plasticizer to every two pounds of resin, it will be seen that the provision of a suitable plasticizer involves a serious question of finding suitable raw materials. The greatest obstacle to the production of good plasticizers at the present time is the unavailability of sufficient supplies of linear acids and alcohols at a reasonable price.

The price of the raw material is particularly important since it usually is the case that a cheaper plasticizer used in a slightly greater amount is more advantageous than the use of somewhat lesser amounts of a more costly plasticizer. The use of considerable quantities of plasticizer is common and is particularly desired in those cases where the plasticizer costs less per pound than the resin.

In view of the above situation, considerable effort has been made to find low cost sources of the necessary linear acids and alcohols. Perhaps the most promising solution to the problem is through the Oxo process in which process the desired higher boiling alcohols are synthesized from olefins, carbon monoxide and hydrogen. The use of this process, however, presupposes a suitable low cost source of the necessary higher boiling olefins. Up to the present time higher boiling olefins produced by the polymerization of lower boiling olefins, e. g. diisobutylene, have been used. Such olefin polymers react well in the Oxo process. However, the resulting alcohols have a higher branched structure and produce inferior plasticizers, e. g. by esterification with phthalic anhydride. Olefinic fractions from the product of the low temperature Fischer-Tropsch process using a cobalt catalyst could be used but this process cannot be justified for the production of such olefins and there is little, if any, possibility of the process being used in this country for the production of gasoline. Olefinic fractions from cracked gasoline and the like are unsuited since it is uneconomical to attempt to concentrate the olefins and, furthermore, the olefins are largely branched secondary olefins which yield quite inferior plasticizers. Pure alpha olefins could be used but there is no supply of such olefins available. One possible source of superior olefins is from the special cracking of highly paraffinic materials such as wax. It is known that such paraffinic materials can be thermally cracked under special conditions to give a product from which a fraction rich in the desired alpha olefin can be separated. It has also recently been found that this cracking process can be improved by cracking such paraffinic materials under special conditions with special activated carbon. Such olefin fractions from the special cracking of wax leave much to be desired, however, since the plasticizer produced through them has relatively poor cold bend properties; also, difficulty is encountered in producing the desired alcohols by the Oxo process apparently due to the presence or formation of one or more materials which tend to poison the Oxo reaction in the CO—$H_2$ addition stage; also, the product from the Oxo process using such materials is unstable and requires a special additional hydrogenation treatment under high pressure to remove or destroy traces of aldehydes and/or unsaturated compounds before it can be used to produce a satisfactory plasticizer.

It has now been found that improved plasticizers can be prepared in good yields starting with paraffinic waxes, provided that a particular fraction of the olefinic cracked product is chosen and treated in the particular method to be described prior to carbonylation to produce the mixture of alcohols. When treating the olefinic product as described the yield of suitable starting material per pound of wax is greatly increased thus affording a suitable low-cost raw material source. Also, the difficulties hitherto encountered in the carbonylation are avoided. Also, the carbonylation product, while a complicated mixture of alcohols of both straight chain and cyclic structure, is stable and does not require the special hydrogenation treatment to render it suitable for direct esterification to produce the plasticizers. Also, the resulting plasticizers have improved cold bend properties.

The starting material is a highly paraffinic oil or wax containing at least 50% paraffins. Petroleum wax or a distillate containing at least 20% wax is the preferred stock. Such material is thermally cracked under special conditions as described, for example, in British Patent No. 426,843. Alternatively, the material may be catalytically cracked as described in pending application Serial No. 121,908 now Patent No. 2,611,789. As pointed out in said British Patent No. 426,843 it is possible by very careful fractionation to separate from the cracked product certain fractions (plateaus) having a boiling range of only a few degrees which fractions consist largely of olefins of a given molecular weight, e. g. the $C_7$ olefins. A careful investigation has shown, however, that contrary to previous belief, such fractions contain not only the olefin isomers, but considerable quantities of cyclic olefins having $C_6$ and $C_5$ rings. Also, the yields of such narrow cuts are quite small. If a larger fraction of somewhat wider boiling range is used for the feed for the carbonylation, the difficulties mentioned above are encountered and a plasticizer having inferior cold bend properties results. In the process of the invention such a wide range fraction is separated and this fraction is then treated in the particular manner to be described. For the production of plasticizers a fraction consisting of materials having from 6 to 8 carbon atoms is preferred. Such a fraction distills between about 55° C. and 135° C.

The separated fraction consisting largely of alpha olefins is reacted with a controlled amount of concentrated sulfuric acid. In view of the fact that no methods are available for completely analyzing the composition of such fractions it is not possible to say with certainty just which constituents of the mixture are reacted. We have been able to determine, however, that such fractions do contain hitherto unexpected amounts of unsaturated naphthenes and that some of these are reacted with the sulfuric acid. The fraction usually contains small amounts of diolefins and these are, of course, reacted when present. Tertiary olefins and aromatics are present only in small amounts and in such amounts do not exert any detrimental effect; they are likewise reacted with the sulfuric acid. The desired alpha olefins, of course, also react with the sulfuric acid. By controlling the reaction it is, however, possible to actually increase the concentration of alpha olefins slightly.

In the treatment of the olefin fractions it is essential to use a sulfuric acid of at least 92% concentration and to contact the acid with this fraction with very vigorous agitation. Attempts to utilize more dilute acid failed to effect the desired improvement. Suitable agitation is obtained by the use of a very efficient mixer such as a turbo mixer or by feeding the separate streams into a centrifugal pump. The amount of sulfuric acid to be used must also be carefully regulated since an insufficient amount fails to afford the desired effect and an excess causes a great loss of the desired alpha olefins. In practice the necessary amount of sulfuric acid is between 1% and 4% and the optimum amount is determined by a laboratory test in which the sulfuric acid is slowly added with vigorous agitation to a known quantity of the olefinic fraction in an insulated container while noting and plotting the incremental temperature rise. The noted incremental temperature rise in a typical case is shown in the following tabulation. (1400 g. $C_6$—$C_8$ fraction.)

| ml. 96% $H_2SO_4$ | $\Delta T$, °C. |
|---|---|
| 0 | 0 |
| 5 | 7.5 |
| 10 | 14.0 |
| 15 | 19.0 |
| 20 | 20.9 |
| 25 | 22.8 |

It will be noted that the temperature rises more steeply at first and then rises at a lesser, more or less, constant rate. The optimum amount of sulfuric acid to be used corresponds to the point where the lesser more or less constant rise begins. In the illustrated case it corresponds to 15 ml. acid. It is found that this optimum amount of sulfuric acid is just sufficient to reduce the concentration of olefins of the structure

to substantially nil, e. g. less than 1% by weight (R and R' being alkyl groups). The concentration of such olefins in the product may therefore be used, if desired, for control purposes to judge the optimum amount of acid. This is, however, merely a coincidence since the olefins of said structure are normally present only in small amounts, e. g. 5%, and are not in any way harmful. It would be preferred to retain these alpha olefins but their loss is unavoidable.

After effecting the main reaction with vigorous agitation the mixture may be allowed to react slowly for some time until the sulfuric acid is substantially exhausted. Thus the reacting mixture may be pumped to a time tank or packed tower at ambient temperature where it may remain for a few minutes up to several hours until the reaction ceases to be attended by a rise in temperature. The sulfuric acid may then be removed by decantation. The sulfuric acid product may be hydrolyzed to produce a mixture of alcohols and polymers, if desired, but the product is not suited for the production of plasticizers.

The olefin fraction decanted from the sulfuric acid layer must be refractionated to remove small amounts of polymers. Also it is important that this fractionation be carried out in the presence of an alkali, e. g. concentrated NaOH to prevent contaminating the overhead product with traces of sulfur compounds. In the described treatment approximately 7% to 15% of the olefinic fraction is reacted. The remaining part can be carbonylated by the Oxo process without difficulty and yields a mixture of alcohols which do not require subsequent hydrogenation and can be directly converted into plasticizers, e. g. by esterification with a dibasic acid. It is preferred, however, to first adjust the composition of the olefin fraction so that of the olefins present the concentration of $C_8$ olefins is about 12%±3% the concentration of $C_7$ olefins is about 43%±5%, and the concentration of $C_6$ olefins is about 45%±5%. When the olefin fraction has been partly reacted with sulfuric acid as described this adjustment may be made much more easily than would otherwise be the case. It is found that by careful fractionation substantially pure 1-hexene, 1-heptene and 1-octene fractions boiling within 1° C. can be separated from the olefinic fraction after the described partial reaction with sulfuric acid. This is not possible with the fractions prior to such partial reaction. Neither is it possible with higher boiling fractions due to the much more complicated nature of fractions with a boiling range above the boiling point of octene. Octene lies just on the borderline. This sharp separation, shown in Example III below, can be most advantageously used to adjust the composition of the desired fraction. Thus a part of the treated product can be fractionated to separate the described substantially pure 1-alkenes and these may then be blended with the remainder of the cracked fraction to adjust the ratios of $C_6$, $C_7$ and $C_8$ olefins back to the original desired composition. The product, after carbonylation and esterification then yields plasticizers having a lesser content of ring groups and consequently better cold bend properties. Also the yields of plasticizers per pound of wax are much higher than in the older method where a much narrower fraction had to be utilized in order to produce a satisfactory plasticizer.

Certain aspects of the invention are illustrated in the following examples.

*Example I*

A 55–135° C. alkene fraction containing $C_6$—$C_8$ alkenes (obtained by thermally cracking a paraffin wax as described in British Patent No. 426,833) was reacted with 4% by weight of 98% sulfuric acid at room temperature for 15 minutes with vigorous agitation. After separating from the sulfuric acid, the unreacted material was treated with 2% caustic soda solution and fractionated to remove the small amount of polymers. Thirteen percent of the $C_6$—$C_8$ fraction reacted with the sulfuric acid; the remainder after distillation had the following composition. The composition of the $C_6$—$C_8$ fraction before reacting with sulfuric acid is shown for comparison.

| | Before | After |
|---|---|---|
| Bromine Number | 151 | 150 |
| Sulfur Content | 0.05 | 0.05 |
| Alpha Alkenes, percent by weight | 63 | 64 |
| Alpha' Alkenes,[1] percent by weight | 5.1 | 0.0 |
| Secondary Alkenes, percent by weight | 2.6 | 3.9 |
| Unsaturated Naphthenes, percent by weight | 19 | 14 |

[1] Alpha' alkenes are those having the structure R—C—R' wherein R and R' are alkyl groups.
$$\overset{\|}{CH_2}$$

*Example II*

A $C_6$—$C_8$ olefin fraction was obtained by fractionation of the product obtained by cracking wax as described in British Patent No. 426,823. Three hundred kilograms of the olefin fraction were reacted with 2½% by weight of 96% sulfuric acid added over a period of 45 minutes. The reaction was carried out while vigorously agitating with a stirrer rotating at 900 R. P. M. The initial temperature was near 0° C. and rose to about 35° C. After the addition of the sulfuric acid had been completed, the stirring was continued for another 15 minutes after which the mixture was allowed to stand for about 10 minutes. The unreacted olefin fraction was withdrawn by decantation, washed with water and finally with a 4% solution of sodium hydroxide. As a result of this treatment the percentage of $C_6$ olefins, based on the total olefins, dropped to below the above-described minimum. The correct ratio of $C_6$—$C_7$ olefins was then re-established by blending back a quantity of narrow cut $C_6$ olefin fraction. The properties of the treated and reblended fraction (after fractionation to remove polymers) are compared with those of the original $C_6$—$C_8$ fraction in the following table:

|  | Before | After |
|---|---|---|
| Bromine Number | 153 | 159 |
| Alpha Olefins, percent by weight | 67 | 72 |
| Alpha' Alkenes, percent by weight | 3 |  |
| Secondary Alkenes, percent by weight | 3 | 3 |
| Unsaturated Naphthenes, percent by weight | 21 | 16 |

Example III

A residual wax originating from a Venezuelan petroleum was thermally cracked in the vapor phase as described in British Patent No. 443,263. The product was carefully fractionated to separate a fraction boiling between 55° C. and 135° C. This fraction, consisting largely of $C_6$—$C_8$ alpha olefins, was reacted with 2% by weight of 96% sulfuric acid. The sulfuric acid was added at one operation at room temperature and the mixture agitated for 20 minutes in a turbo mixer whereby the temperature rose to 65° C. The unreacted olefin fraction was then separated from the sulfuric acid by decantation, washed with water, washed with dilute caustic, and finally washed again with water. It was then subjected to sharp fractionation whereby a fraction boiling between 63–64° C. was separated. This fraction had the following properties:

$n_D^{20} = 1.3880$
$d_4^{20} = 0.6750$
Bromine Number = 190

It was shown by infra-red analysis to consist of pure 1-hexene. The yield of 1-hexene amounted to 30% by weight of the treated fraction.

The 63–64° fraction was hydrogenated with a nickel-kieselguhr catalyst at 120° C. and 200 atmospheres. The product had the following properties. The properties of pure hexane are given for comparison:

|  | Hydrogenated Product | Pure Hexane |
|---|---|---|
| Boiling Point °C | 68.75 | 68.75 |
| $n_D^{20}$ | 1.3760 | 1.3749 |
| $d_4^{20}$ | 0.6650 | 0.6638 |

The deviation in refractive index and density indicates the presence of approximately 1% by weight of cyclohexane or methyl cyclopentane which form pseudo azeotropes with normal hexane. By an anlogous process pure 1-heptane was obtained in a 25% yield by fractionating the remaining olefin fraction after partially reacting with sulfuric acid. The 1-heptane fraction boiling between 94–95° C. had the following properties:

$n_D^{20} = 1.4020$
$d_4^{20} = 0.6920$
Bromine Number = 162

Upon hydrogenation, 2% by weight of ring compounds were indicated by the specific refraction method.

Unsaturated naphthenes in the 55–135° C. fractions from the selective cracking of wax are, as pointed out, found to be present in much greater concentrations than hitherto expected. These compounds react readily in the Oxo process to give the corresponding cyclic alcohols, e. g. dimethyl cyclohexanol. The esters of such alcohols, e. g. bis(dimethylcyclohexyl carbinyl) phthalate have poor cold bend properties. For example, when this compound is combined with polyvinyl chloride resin at loadings of 60 and 80 parts per 100 parts of resin the brittle points are +15° C. and +7.5° C., respectively, whereas brittle points well under 0° C. are necessary for a satisfactory plasticizer.

It is to be emphasized that the described reaction with sulfuric acid is not the equivalent of conventional refining treatments. As previously pointed out, more dilute sulfuric acid is inoperative. No satisfactory results were obtained using sulfuric acid of 85% or even 90% concentration. Also various other refining treatments failed to effect the desired improvement.

Example IV

A $C_6$—$C_8$ olefin fraction from the product of selective cracking of wax was refined by passing it through non-activated Fuller's earth at 200° C. and 20 atmospheres pressure. While a refining in the ordinary sense was obtained, a very poor product resulted. During the treatment approximately 20% of the original alpha olefins were converted to beta olefins. This would be very desirable in gasoline production but is definitely undesirable for the present purpose.

Example V

A similar $C_6$—$C_8$ fraction was subjected to a refining treatment known to be quite selective for the removal of diolefins and used commercially for the treatment of cracked gasolines. In this treatment the material is passed in the vapor phase through a bed of coke wet with phosphoric acid. The contact time is 50 seconds. The desired effect was not obtained. Furthermore, over 20% of secondary olefins were formed with a drastic drop in the desired alpha olefins (60% to 21%).

Example VI

Treatment with liquid 85% phosphoric acid at room temperature failed to effect any improvement and when the reaction temperature was raised to the boiling point of the olefin fraction excessive losses of the desired alpha olefins occurred.

The invention claimed is:

1. In a process for the production of a plasticizer from a paraffinic wax through the steps of cracking the wax under conditions to produce an olefinic product rich in alpha olefins, carbonylation of the olefins so produced, and esterification of the carbonylation product, the improvement which comprises separating by fractionation from the product of said cracking a $C_6$—$C_8$ fraction, reacting said fraction with from 1 to 4% sulfuric acid of at least 92% concentration with agitation, separating the unreacted hydrocarbon fraction from the resulting sulfuric acid phase and fractionating said unreacted hydrocarbon fraction in the presence of alkali prior to carbonylating it.

2. In a process for the production of a plasticizer from a paraffinic wax through the steps of cracking the wax under conditions to produce an olefinic product rich in alpha olefins, carbonylation of the olefins so produced, and esterification of the carbonylation product, the improvement which comprises separating by fractionation from the product of said cracking a $C_6$—$C_8$ fraction, reacting said fraction with from 1 to 4% sulfuric acid of at least 92% concentration with agitation, separating the unreacted hydrocarbon fraction from the resulting sulfuric acid phase, fractionating said unreacted hydrocarbon fraction in the presence of alkali, separating a portion of said unreacted hydrocarbon fraction by fractionation into a $C_6$ fraction, a $C_7$ fraction and a $C_8$ fraction, and blending said latter fractions with the remainder of said unreacted hydrocarbon fraction in amounts such that the olefins in the mixture consist of $45\pm5\%$ $C_6$ olefins, $43\pm5\%$ $C_7$ olefins and $12\pm3\%$ $C_8$ olefins.

(References on following page)

References Cited in the file of this patent

UNITED STATES PATENTS

| | | |
|---|---|---|
| 1,483,835 | Ramage | Feb. 12, 1924 |
| 2,015,077 | Lawson | Sept. 24, 1935 |
| 2,128,971 | Snow | Sept. 6, 1938 |
| 2,244,164 | Lazar et al. | June 3, 1941 |
| 2,415,102 | Landgraf | Feb. 4, 1947 |
| 2,504,682 | Harlan | Apr. 18, 1950 |
| 2,544,271 | Liedholm et al. | Mar. 6, 1951 |
| 2,560,360 | Mertzweiller et al. | July 10, 1951 |

FOREIGN PATENTS

| | | |
|---|---|---|
| 684,958 | Great Britain | Dec. 31, 1952 |

OTHER REFERENCES

U. S. Naval Tech. Mission in Eur. Rept. No. 248–45, pgs. 118–19; abstract published in Bibliography of Scientific & Indus. Repts., Dept. of Commerce, OTS, vol. 2, No. 5, pg. 321, 8/2/46.

FIAT Final Rept. No. 1000, PB 81383, pgs. 24–26; abstract published in above Rept., vol. 7, No. 13, page 1139, Dec. 26, 1947.

FIAT Final Report No. 1000, PB 81383, pages 49–51, Dec. 26, 1947.